Figure 1:
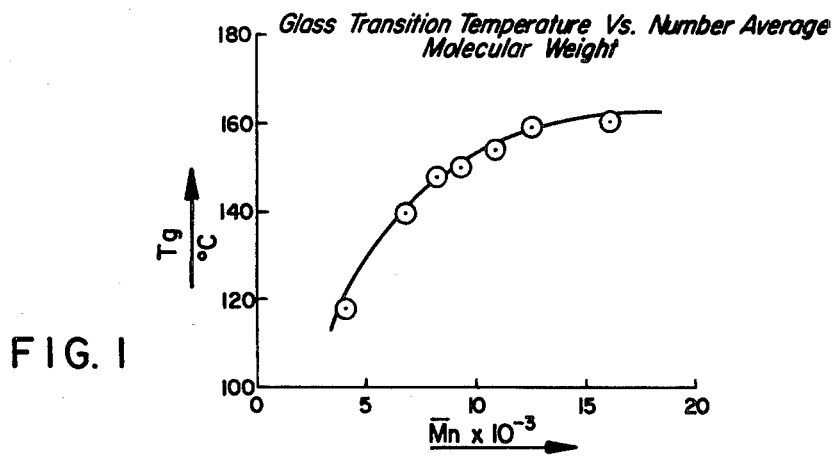

United States Patent [19]

Fan et al.

[11] 4,183,874

[45] Jan. 15, 1980

[54] SILANE END-CAPPED POLYARYLENE SHAPED ARTICLES AND MIXED RESINS

[75] Inventors: You-Ling Fan, East Brunswick; Alford G. Farnham, Mendham, both of N.J.

[73] Assignee: Union Carbide Corporation, New York, N.Y.

[21] Appl. No.: 897,859

[22] Filed: Apr. 19, 1978

Related U.S. Application Data

[62] Division of Ser. No. 681,830, Apr. 30, 1976, Pat. No. 4,093,600.

[51] Int. Cl.$^2$ .................. C08G 75/00; C08G 65/48
[52] U.S. Cl. .................................. 525/100; 156/327; 156/329; 525/102; 264/171; 264/236; 264/325; 264/347; 428/411; 428/426; 428/457

[58] Field of Search ............. 260/41 ET, 49, 824, 260/824 EP; 428/411, 426, 457; 156/329, 327; 264/176, 236, 325, 347, 171

[56] References Cited

U.S. PATENT DOCUMENTS

| | | | |
|---|---|---|---|
| 3,539,655 | 11/1970 | Strachan et al. | 260/824 |
| 3,539,656 | 11/1970 | Noshay et al. | 260/824 |
| 3,539,657 | 11/1970 | Noshay et al. | 260/824 |
| 3,769,150 | 10/1973 | King et al. | 528/174 |
| 3,857,825 | 12/1974 | Streck et al. | 260/889 |
| 3,960,985 | 6/1976 | Cooper | 260/874 |

OTHER PUBLICATIONS

Udel, Polysulfone for High-Temperature Structural Adhesive Applications, Union Carbide Product Data, Jun. 1972.

*Primary Examiner*—Lester L. Lee
*Attorney, Agent, or Firm*—Franklyn Schoenberg

[57] ABSTRACT

Silane end-capped polyarylene polyethers are disclosed.

10 Claims, 4 Drawing Figures

SILANE END-CAPPED POLYARYLENE SHAPED ARTICLES AND MIXED RESINS

This application is a division of our prior U.S. application Ser. No. 681,830, filed Apr. 30, 1976, now U.S. Pat. No. 4,093,600.

The invention relates to silane end-capped polyarylene polyethers.

Thermoplastic polysiloxane-polyarylene polyether copolymers have been disclosed. For instance, Strachan et al., in U.S. Pat. No. 3,539,655, disclose such copolymers having at least one siloxane chain and at least one polyarylene polyether chain. Each siloxane chain contains at least two siloxane units of the formula:

$$R_b SiO_{4-b/2}$$

wherein b is a number having a value of from 1 to 3, and wherein R represents a monovalent hydrocarbon group, a divalent organic group, or oxy (—O—). The monovalent hydrocarbon groups, which can contain substituent groups, are substituent groups on the silicon atom, and are bonded thereto by direct carbon-to-silicon bonds. The divalent organic groups and the oxy groups are the groups that link the siloxane chains to the polyarylene polyether chains.

Other types of thermoplastic siloxane-polyarylene polyether copolymers are described in Noshay et al., U.S. Pat. Nos. 3,539,656 and 3,539,657.

In a first aspect, the invention provides compositions that comprise linear polyarylene polyether chains that are terminated at both ends by reactive silane end-capping or chain terminating groups. The said reactive silane groups contain either substituent groups that are hydrolyzable to hydroxyl (silanol) groups, or the silanol groups themselves.

In a second aspect, the invention provides a method for "prehydrolyzing" the polyarylene polyethers that contain hydrolyzable silane groups.

In a third aspect, the invention relates to the use of the compositions of the invention as adhesives and coatings.

In a fourth aspect, the invention relates to the use of the compositions of the invention as a coupling or sizing agent for mineral fibers such as fiberglass and asbestos, and to the use of the sized fibers as a reinforcing agent in plastic composites.

And in a fifth aspect, the invention provides blends of silane end-capped polyarylene polyethers with conventional polyarylene polyethers.

Thermoplastic polyarylene polyethers constitute a known class of compositions. For instance, see Johnson et al., British Pat. No. 1,078,234; D'Alessandro, U.S. Pat. No. 3,355,272; Darsow et al., U.S. Pat. No. 3,634,354; Rose, U.S. Pat. NO. 3,928,295; Newton et al., U.S. Pat. No. 3,764,583; Leslie et al., British Pat. No. 1,369,156; Feasey et al., British Pat. No. 1,348,639; Jones, British Pat. No. 1,016,245; and King et al., British Pat. No. 1,342,589.

The silane end-capped polyarylene polyethers differ from the known thermoplastic polyarylene polyethers most significantly in that the compositions of this invention have reactive silane end-capping groups. In its broadest aspect, the compositions of this invention can be represented by the formula:

$$\text{X—polyarylene polyether chain—X'} \qquad \text{I}$$

wherein X and X' individually represent silane groups, each of which contains at least one hydrolyzable substituent group or at least one hydroxyl (silanol) substituent group.

One preferred class of compositions that are within the scope of Formula I are the silane end-capped polymers that are produced by reacting an alkali metal phenoxide end-capped polyarylene polyether with a halo-substituted hydrocarbylsilane that contains at least one hydrolyzable substituent. These compositions can be represented by Formula II:

$$(R')_3 Si\text{-}R\text{-}O\text{—}(Ar\text{-}O)_n R\text{-}Si(R')_3 \qquad \text{II}$$

wherein each R' individually is alkyl or a hydrolyzable group such as alkoxy, dialkylamino, or oxycarbonylalkyl provided that at least one R' on each silicon represents a hydrolyzable group; wherein each R individually represents a divalent hydrocarbyl group bonded to the silicon atom with a direct carbon-to-silicon bond and bonded to the oxy (—O—) group through an aliphatic carbon atom, such as alkylene, cycloalkylene, and aralkylene; wherein n is a positive number and represents the degree of polymerization of the polyarylene polyether chain; and wherein $A_r$ represents a divalent aromatic group which can be the same or a different group from one —AR—O— unit to the next, and in which each aromatic group is bonded to the connecting oxy groups through aromatic carbon atoms.

When the compositions of Formula II are reacted with water or hydrolyzed, the hydrolyzable substituent groups are replaced with hydroxy groups.

One convenient way to produce the compositions of Formula II is the following:

Dihydric phenol, such as 2,2-bis(4-hydroxyphenyl)-propane ("bisphenol-A"), is dissolved in a solvent such as a mixture of monochlorbenzene and dimethyl sulfoxide. The dihydric phenol is converted to the alkali metal salt by adding an alkali metal hydroxide, such as sodium hydroxide, and removing the water of condensation by azeotropic distillation. An aromatic compound having two activated halo substituents is added to the alkali metal salt. 4,4'-Dichlorodiphenyl sulfone is illustrative of such aromatic compounds. The dihalo aromatic compound is used in a controlled proportion so that there will be a stoichiometric excess of the said alkali metal salt. The dihalo aromatic compound and the alkali metal salt are reacted to form a linear polyarylene-polyether chain having alkali metal salt end groups. This compound is then reacted with a haloalkyl silane, such as 3-chloropropyl trimethoxysilane, to form a silane end-capped polyarylene-polyether, which is recovered by coagulating the solution in anhydrous methanol or anhydrous isopropyl alcohol.

The foregoing outline of a process for producing the compositions of Formula II can be represented by the sequence of reactions presented below in which HO—E—OH represents the dihydric phenol and Cl—E'—Cl represents the dihalo aromatic compound.

$$\text{HO—E—OH} + 2\text{NaOH} \longrightarrow \text{NaO—E—ONa} + 2\text{H}_2\text{O} \qquad (1)$$
(A)

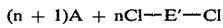  (2)

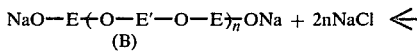

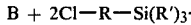 (3)

The dihydric phenol employed can be a mononuclear compound such as hydroquinone or resorcinol, which may be substituted with an inert substituent such as alkyl, alkoxy, or halo.

The dihydric phenol can also be a polynuclear phenol. Examples include p,p'-biphenol, naphthalene diol, alkane bisphenols such as bis(4-hydroxyphenyl)methane and 2,2-bis(4-hydroxyphenyl)propane, bisphenol sulfones such as bis(4-hyroxyphenyl) sulfone, the bisphenol sulfides bis(4-hydroxyphenyl) sulfide, the bisphenol ethers such as bis(4-hydroxyphenyl) ether, and the bisphenol ketones such as bis(4-hydroxyphenyl) ketone.

The preferred dihydric phenols are hydroquinone, bisphenol-A, p,p'-biphenol and bis(4-hydroxyphenyl) sulfone.

The second class of compounds employed are aromatic compounds that have two activated halo substituents. The halo substituents are activated so that, in the absence of a catalyst, the aromatic compound can react with alkali metal phenoxide to form an ether. As is well known in the art, one way to activate the halo substituents is to have an inert electron withdrawing group ortho or para to the two halo groups. The halo-substituted aromatic compound can be a mononuclear compound such as 1,2,4,5,-tetrabromobenzene, 1,2,4,5-tetrachlorobenzene, 2,4- and 2,6-dichlorobenzonitrile, hexachlorobenzene, and 1,4-dibromo-2,3,5,6-tetrachlorobenzene, or it can be a polynuclear compound such as the following: 4,4'-dichlorodiphenyl sulfone; 4,4'-bis(4-chlorophenylsulfonyl)biphenyl; 4,4'-dichlorodiphenyl ketone; 3,4,5,3',4',5'-hexachlorobiphenyl; 4,4'-dibromo-3,5,3',5',-tetrachlorobiphenyl; and others that are known to the art.

Other illustrative dihydric phenols and aromatic compounds that contain two activated halo substituents are disclosed in the patents cited above that disclose thermoplastic polyarylene polyethers. These patents are incorporated herein by reference.

In the sequence of reactions (1), (2), and (3), the dihydric phenol is employed in a stoichiometric excess over the dihalo aromatic compound. Preferably, from about 1.02 to about 1.16 moles of dihydric phenol will be employed per mole of the dihalo aromatic compound. Within this range of proportions, the reduced viscosities in chloroform at 25° C. and at a concentration of 0.2 gram of polymer per 100 milliliters of solution, of the polyarylene polyethers and the silane end-capped polymers derived therefrom, will be within the range of from about 0.1 to about 0.5. (Reduced viscosity is determined by the procedure of ASTM-D-2857.) Proportions outside this range can also be used in some cases when it is desired to produce silane end-capped polymers of either higher or lower molecular weights.

The sequence of reactions (1), (2), and (3) is the most convenient way to produce the compositions of Formula II. However, variations of this procedure are well within the skill of the art and are contemplated by this invention. For instance, Reaction (2) can be carried out with an excess of the dihalo compound (the preferred proportion of stoichiometric excess being the same as that given above for the dihydric phenol), followed by an alkaline hydrolysis reaction to convert the halo substituent to alkali metal phenoxide. Then, after azeotropic removal of water, the product is subjected to Reaction (3) as described herein. Alternatively, the "single salt process" can be employed (e.g., as described in Leslie et al., British Pat. No. 1,369,156) to produce a polyarylene polyether terminated at one end by a halo substituent and at the other by alkali metal phenoxide. Upon alkaline hydrolysis of the halo group, followed by dehydration, the product can then be subjected to Reaction (3), as described herein.

In the first step, Reaction (1), the dihydric phenol is converted to the corresponding alkali metal salt. Two moles of alkali metal hydroxide, such as sodium hydroxide or potassium hydroxide, are reacted per mole of dihydric phenol. Almost exactly stoichiometric quantities should be used. This reaction is carried out in a solvent system that permits azeotropic removal of the water of condensation. A mixture of monochlorobenzene (MCB) ad dimethyl sulfoxide (DMSO) is excellent for this purpose. The DMSO is used as the solvent, and MCB is an azeotroping agent. Other solvents include dimethylacetamide (DMAC), and other azeotroping agents include chlorinated benzenes, benzene, toluene, and xylene. The condensation reaction to produce the alkali metal phenoxide will normally take from about 120 to about 240 minutes at a temperature of from about 110° to about 132° C. While a much broader temperature range is possible, this is the most convenient.

After the water of condensation has been removed azeotropically, the dihalo aromatic compound is added to the reaction mixture to carry out Reaction (2). This reaction is carried out at elevated temperature, for instance, from about 150° to about 170° C., for a period of from about 60 to about 120 minutes.

At the completion of Reaction (2), a polyarylene polyether having alkali metal phenoxide end groups is produced. This composition is reacted with a haloalkyl silane to produce the silane end-capped polyarylene polyethers of Formula II. Among the haloalkyl silanes that can be used are the materials enumerated below.

Haloalkyltrialkoxysilanes such as:
3-chloropropyltrimethoxysilane,
3-chloropropyltriethoxysilane,
3-chloropropyltriisopropoxysilane, chloromethyltrimethoxysilane, chloromethyltriethoxysilane, chloromethyltriisopropoxysilane,
2-chloroethyltrimethoxysilane,
2-chloroethyltriethoxysilane,
2-chloroethyltripropoxysilane,
1-chloroethyltrimethoxysilane,
1-chloroethyltriethoxysilane,
1-chloroethyltripropoxysilane,
3-bromopropyltrimethoxysilane, 2-bromoethyltrimethoxysilane, and bromoethyltrimethoxysilane.

Haloalkyldialkylalkoxysilanes such as:
chloromethyldimethylmethoxysilane, and
chloromethyldimethylethoxysilane.

Haloalkylalkyldialkoxysilanes, such as:
chloromethylmethyldimethyoxysilane,
chloromethylmethyldiethoxysilane, and
chloromethylmethyldipropoxysilane.

Haloalkyltrialkanoyloxysilanes such as:
3-chloropropyltriacetoxysilane, chloromethyltriacetoxysilane,
2-chloroethyltriacetoxysilane,
1-chloroethyltriacetoxysilane,
3-bromopropyltriacetoxysilane, and
2-bromoethyltriacetoxysilane.

Haloalkyltri(dialkylamino)silanes such as:
3-chloropropyltri(dimethylamino)silane,
3-chloropropyltri(diethylamino)silane, chloromethyltri(dimethylamino)silane, chloromethyltri(diethylamino)silane,
2-chloroethyltri(dimethylamino)silane,
2-chloroethyltri(diethylamino)silane,
1-chloroethyltri(dimethylamino)silane,
1-chloroethyltri(diethylamino)silane, and
2-bromoethyltri(dimethylamino)silane.

Haloaralkyltrialkoxysilanes, such as:
p-(chloromethyl)phenyltrimethoxysilane,
p-(chloromethyl)phenyltriethoxysilane, and
p-(chloromethyl)phenyltrisopropoxysilane.

Haloaralkyltrialkanoyloxysilanes, such as:
p-(chloromethyl)phenyltriacetoxysilane.

Haloaralkyltri(dialkylamino)silanes, such as:
p-(chloromethyl)phenyltri(dimethylamino)silane, and
p-(chloromethyl)phenyltri(diethylamino)silane.

The end-capping reaction, i.e., Reaction (3), is carried out by reacting the haloalkyl silane with the alkali metal phenoxide-capped polyarylene polyether produced by Reaction (2). The stoichiometric proportions are two moles of silane per mole of polyarylene polyether. It is preferred to employ about a 2 to 10 mole percent stoichiometric excess of the silane. The reaction mixture should be substantially anhydrous. The reaction medium can be the same solvent system that was employed for Reactions (1) and (2). The reaction is carried out at elevated temperatures, e.g., from about 110° C. to about 165° C. At the recommended temperature range, the reaction will usually take from about 10 to about 90 minutes.

The completion of the reaction can be detected by treating a sample of the reaction mixture with bromocresol purple indicator. When the alkali metal phenoxide has reacted, the treated sample will be greenish yellow in color.

At the completion of the reaction, the reaction mixture can be cooled, filtered to remove salt by-product, and then the silane end-capped polyarylene polyether can be recovered by coagulation in a non-solvent for the polymer, e.g., methanol or isopropyl alcohol. Care should be taken to keep the reaction mixture and the polymer anhydrous until it has been recovered as a solid, in order to avoid premature hydrolysis of the hydrolyzable groups on the silane.

There are alternative ways, using known chemical reactions, to attach the silane end-capping groups to the polyarylene polyether chains. For instance, the alkali metal phenoxide-capped polyarylene polyethers produced by Reaction (2) can be neutralized, as by reacting with dilute aqueous hydrochloric acid, to regenerate the phenolic hydroxyl end groups. After dehydrating, as by azeotropic distillation with MCB or toluene, the phenolic hydroxyl end-capped polyarylene polyethers can be reacted with two molar equivalents of an isocyanato-substituted silane, or a vertical epoxide-substituted silane. Specific illustrative known silanes that can be used for this purpose include:
3-isocyanatopropyltriethoxysilane,
3-(glycidoxy)propyltriethoxysilane, and
3,4-epoxycyclohexylethyltriethoxysilane.

The reactions that occur in these cases are summarized as follows:

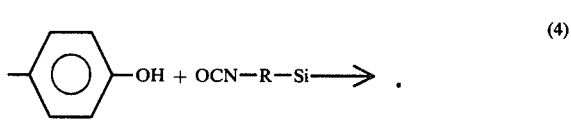

(4)

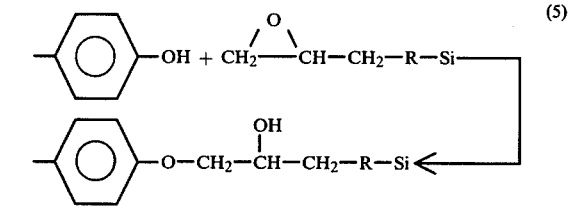

(5)

Subsequent recovery and use of the silane end-capped polyarylene polyethers produced by Reactions (4) and (5) are analogous to that described herein for those produced by Reaction (3).

The Examples set forth below illustrate the practice of the invention. The silane end-capped polyarylene polyethers made from bisphenol-A, 4,4'-dichlorodiphenyl sulfone, and 3-chloropropyltrimethoxysilane, are often referred to as "PSF-SR" (polysulfone-silane reactive).

EXAMPLE 1

This Example illustrates the carrying out of Reactions (1), (2), and (3).

A. Raw Materials

Bisphenol-A -UCC bisphenol A; 99.71% purity. Used without further purification.

Sulfone Monomer (4,4'-dichlorodiphenyl sulfone)—ICI sulfone monomer; 100% purity assumed; used as is.

3-chloropropyltrimethoxysilane -UCC A-143 silane; 97.8% purity.

Sodium Hydroxide—Mallinckrokt Chemical Works; 98% purity.

Dimethyl Sulfoxide (DMSO)—Matheson Coleman and Bell.

B. Analytical Methods

Determination of sodium phenolate end groups

This information is needed for determining the amount of 3-chloropropyltrimethoxysilane required for the end-capping reaction. A titration method is used for this purpose.

Upon completion of the polymerization step (Reaction 2), a small sample (about 2–3 grams) of the reaction mixture is quickly taken from the vessel and placed in a 250 milliliter Erlenmeyer flask. The sample is weighed and a 50 milliliter solution of DMSO/MCB (1/1) is introduced. The sample solution is heated gently on a hot plate until dissolution is complete. A drop of bromcresol purple indicator (0.5 percent in methanol) is added and the sample is titrated with a 0.1 N HCl solution (in DMSO) to a yellow end point (pH 5.2–6.8). Duplicate tests should be made.

The amount of sodium phenolate end groups in gram-equivalents, can be calculated from Equation (i):

$$\text{Sodium phenolate end groups} = \frac{NHCl \times NHCl}{1000} \times \frac{Wt}{Ws} \quad (i)$$

Where
- Ws = Sample weight in grams
- Wt = Total weight of reaction mixture in grams
- NHCl = Normality of NCl/DMSO solution.
- VHCl = Volume of HCl/DMSO used in milliliters The amount of 3-chloropropyltrimethoxysilane (m. wt. = 198) needed for the end-capping, on a 10 percent excess basis, can be calculated from Equation (ii), where Ps is the purity of the silane used.

$$\begin{aligned} & \text{3-chloropropyltrimethoxysilane (in grams)} \quad (ii) \\ &= \frac{NHCl \times VHCl \times Wt \times 198 \times 1.10}{1000 \times Ws \times Ps} \\ &= \frac{0.2178 \times NHCl \times VHCl \times Wt}{Ws \times Ps} \end{aligned}$$

Test for completion of end-capping reaction

A 1 or 2 gram sample of the reaction mixture is introduced into a 250 milliliter Erlenmeyer flask containing a 50 milliliters solution of DMSO/MCB (1/1). The sample solution is heated on a hot plate until dissolution is complete. Two drops of the bromcresol purple solution are added. The reaction is complete if the indicator turns greenish yellow or yellow. Otherwise, the color will be blue indicating the presence of unreacted sodium phenolate end groups.

C. Preparative Procedure

The following describes the typical procedure used for the preparation of PSF-SR resins.

Into a four-necked, two-liter Morton flask, equipped with a mechanical stirrer, water trap, condenser, thermometer, addition funnel, and Argon inlet, there was placed 183.16 grams of bisphenol-A (0.8 mole), 350 milliliters of DMSO and 700 milliliters of MCB. The slurry was heated to 90° C. to give a clear solution. A 50 percent aqueous sodium hydroxide solution containing 1.6 moles of sodium hydroxide was charged into the reaction vessel. Azeotropic distillation began at around 112° C. and reached 132° C. (b.p. of MCB) in about three hours. At this point, 108 grams of water was collected. Thereafter, MCB was distilled off until the reaction temperature reached 150° C. when 593 grams of MCB was collected. A hot solution of 213.68 grams (0.745 mole) of sulfone monomer in 230 milliliters MCB was introduced rapidly into the reaction vessel. Distillation of MCB was resumed until the reaction temperature attained 165° C., when an additional 391 grams of MCB was distilled off. The polymerization was maintained at this temperature for an additional 90 minutes. Material balance at this point is shown as follows:

| Material | Reactor Charge, grams | Water Trap Discharge, grams |
|---|---|---|
| bisphenol-A | 183.16 | |
| sulfone monomer | 213.68 | |
| DMSO | 375.2 | |
| MCB | 1,028.6 | 984.0 |
| NaOH solution | 129.96 | |
| H₂0 | 110.0 | |
| Total | 1,930.58 | 1,094.4 |

There was 838.18 grams of reaction mixture remaining in the vessel and the polysulfone oligomer concentration was about 47.5 percent.

Samples were drawn from the reaction vessel for sodium phenolate end-group analysis. The average value was found to be 0.1015 gram-equivalent.

The reaction mixture was brought to a temperature of 115° C. and 22.23 grams of 3-chloropropyltrimethoxysilane [95 percent purity, 5 percent excess from Equation (ii)] was introduced with a syringe. Care must be taken to prevent atmospheric moisture from getting into the system, and the maintaining of an anhydrous condition throughout the end-capping step is essential to prevent premature gelation. The reaction mixture was stirred at 115° C. for 75 minutes until the bromcresol purple test became greenish yellow in color. Thereafter, the reaction was stopped, and the reaction mixture was cooled down to room temperature. The hazy, viscous solution was diluted with dry MCB to a total solids concentration of 28 percent, and was subsequently filtered to give 90.3 grams of salt (96.6 percent of the theoretical amount) and a clear, amber-colored filtrate. The latter was poured into a Waring blender containing a large excess amount of isopropanol (or methanol) to coagulate the PSF-SR resin, which was washed with more isopropanol, filtered and was dried in a vacuum oven at 85° C.

| | |
|---|---|
| product recovered | 324 grams (95.6 per cent of theoretical) |
| R.V. (in chloroform, at 25° C. | 0.26 dl/grams |
| melting point | 188°–192° C. |
| $\overline{M}n$ (by NMR method) | 8,817 |

The required end-capping time can be shortened dramatically by adding the 3-chloropropyltrimethoxysilane at the polymerization temperature. A higher end-capping efficiency is also obtained.

When the end-capping step in the above Example was carried out at 158° C. for a period of 30 minutes, the recovered product was practically identical to the one end-capped at 115° C.

| | |
|---|---|
| product recovered | 316 grams (93.3 per cent of theoretical) |
| *R.V. (in chloroform at 25° C.) | 0.27 deciliters/gram |
| melting point | 188°–192° C. |
| $\overline{M}n$ (by NMR method) | 9,910 |

*Reduced viscosity-Determined by the procedure of ASTM-D-2857 at a concentration of 0.2 grams of PSF-SR in 100 milliliters of solution.

D. $\overline{M}n$ Determination

Number average molecular weight ($\overline{M}n$) of the PSF-SR resins is determined by a nuclear magnetic resonance (NMR) technique using a Varian 100 MHZ NMR Instrument. Assuming the PSF-SR resins are completely end-capped, i.e., each molecule is terminated with two silane end groups (and there is no hydrolysis of the end groups), they are represented by the following general formula:

Example 1, were determined by NMR. The reduced viscosities in chloroform were also determined. The results are tabulated in Table I, below.

TABLE I
PREPARATION AND CHARACTERIZATION OF REPRESENTATIVE PSF-SR

| Sulfone/Bis-A Charge Ratio | Polymerization | | End-Capping | | R.V. Chloroform | | | Recovery, |
|---|---|---|---|---|---|---|---|---|
| Mole/Mole | T °C. | Medium | T °C. | $t_{min.}$ | 25° C. | n | $\overline{M n}$ | Percentage |
| 0.965 | 163 | DMSO | 118 | 180 | 0.42 | 45 | 21,200 | 95 |
| 0.96 | 163 | DMSO | 118 | 180 | 0.33 | 21 | 10,000 | 95 |
| 0.98 | 165 | DMSO | 115 | 60 | 0.46 | 82 | 37,000 | 97 |
| 0.93 | 164 | DMSO | 95–115 | 135 | 0.26 | 19 | 8,817 | 96 |
| 0.96 | 170 | DMAC | 105–110 | 60 | 0.37 | 42 | 19,370 | 95 |
| 0.92 | 165 | DMAC | 115 | 60 | 0.21 | 17 | 8,806 | 97 |
| 0.86 | 165 | DMSO | 100 | 60 | 0.16 | 7 | 4,112 | 94 |
| 0.93 | 163 | DMSO | 140 | 60 | 0.29 | 22 | 10,900 | 94 |
| 0.93 | 163 | DMSO | 158 | 30 | 0.27 | 20 | 9,910 | 92 |
| 0.96 | 165 | DMSO | 160 | 30 | 0.34 | | | 92 |

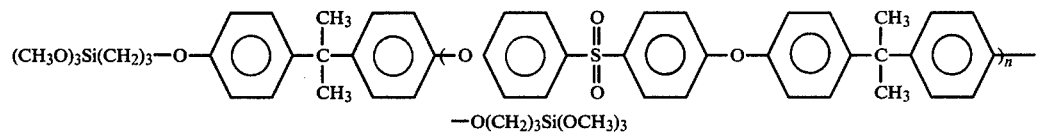

Where n is the number average degree of polymerization.

Mn and n values of any PSF-SR resins can be calculated from the signal intensities of the gemdimethyl (Hg) and silyl methoxy (Hs) protons measured by the NMR method.

$$\overline{n} = 3Hg - Hs/Hs \quad \text{(iii)}$$

$$\overline{Mn} = 442\overline{n} + 552 \quad \text{(iv)}$$

EXAMPLE 2

The molecular weights of the silane end-capped polyarylene polyethers of the invention are largely dependent upon the proportion of dihydric phenol to dihalo aromatic compound employed in the polymerization step, i.e., in Reaction (2). A series of polymers were prepared by procedures analogous to that described in Example 1, using varying proportions of bisphenol-A and sulfone monomer. The solvent systems used were either DMSO/MCB or DMAC/MCB. The molecular weights and the values for n in the formula shown in

EXAMPLE 3

Into a 1 liter, 4-necked flask, fitted with mechanical stirrer, water-trap, addition funnel, thermometer, and argon inlet, there was placed 500 milliliters of dry MCB, and 90.0 grams of a silylmethoxy end-capped polysulfone having the following composition:

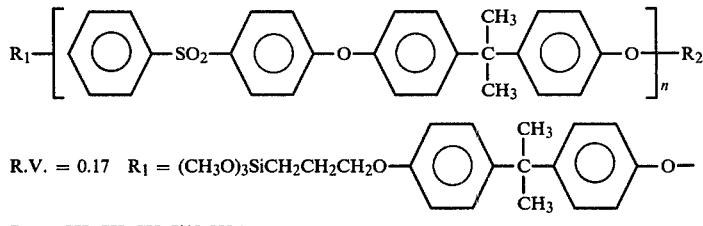

The system was thoroughly dried by distilling off 100 milliliters of MCB. The reaction vessel temperature was lowered to 80° C., and 35.9 grams of freshly distilled glacial acetic acid was introduced. The reaction was maintained at temperatures between 80° and 85° C. for one hour before raising the temperature to refluxing. An additional 100 milliliters of solvents were distilled. Thereafter, the temperature was lowered to 65° C., and the polymer recovered by coagulation and repeated washing in heptane. After vacuum-drying, a white solid polymer was obtained. The polymer had a reduced viscosity in chloroform at 25° C. of 0.19 deciliters/gram, and would cure rapidly upon heating in a capillary tube. The recovery was 98 percent. On the basis of IR evidence, the product contained silyl-acetoxy end-groups, and had the following formula:

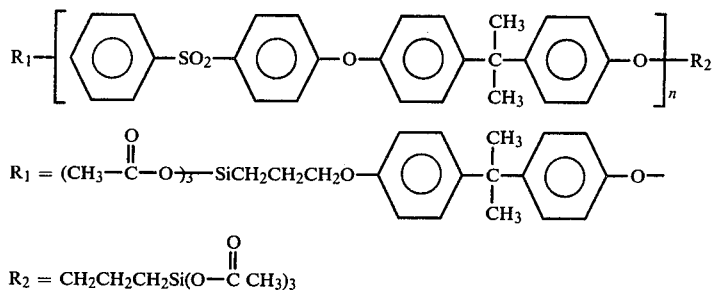

The same polymer can be produced directly by substituting 3-chloropropyltriacetoxy silane for the 3-chloropropyltrimethoxysilane used in Example 1. Since acetoxy groups hydrolyze much more rapidly than alkoxy groups, the reaction mixture would have to be strictly anhydrous when using an acetoxy silane.

EXAMPLE 4

Using the same setup and silyl methoxy end-capped polysulfone described in Example 3, 90 grams of the polymer and 500 milliliters of dry MCB were charged into the reaction vessel and heated to reflux. The system was thoroughly dried by distilling off 100 milliliters of MCB. A solution of 0.5 gram glacial acetic acid in 50 milliliters of freshly distilled isopropanol was rapidly introduced into the reaction vessel. The reaction mixture was refluxed at 96° C. for 2 hours. Thereafter, the temperature was raised gradually until 100 milliliters of solvent was distilled off; this took about 40 minutes. Upon cooling to room temperature, the polymer was coagulated in isopropanol, washed, and dried under vacuum. 84 Grams of a white solid polymer was recovered. The polymer had a reduced viscosity in chloroform at 25° C. of 0.18, and a melting point of 168°–170° C. Analysis by NMR spectroscopy indicated that the product contained about 20 percent of silylisopropoxy end groups.

EXAMPLE 5

Using the same setup and silyl methoxy end-capped polysulfone described in Example 3, 90 grams of the polymer and 500 milliliters of dry MCB were charged into the reaction vessel. The polymer solution was heated to reflux and 100 milliliters of MCB was distilled off to thoroughly dry the system. The vessel temperature was subsequently lowered to 50° C., when 20 grams of acetyl chloride was introduced. The reaction was maintained at 58° to 60° C. for 90 minutes. Thereafter, excess acetyl chloride was distilled off by gradually increasing the temperature to 129° C. The vessel temperature was lowered to 60° C. and 35 grams of freshly distilled diethylamine was added. The addition was complete in about 30 minutes. The reaction temperature was again raised gradually by distilling off the excess diethylamine and MCB until 250 milliliters of condensate was collected. Upon cooling to room temperature, the polymer was coagulated in heptane, washed, and dried under vacuum. A slightly yellowish solid was obtained. The recovery was 97 percent. The polymer had a reduced viscosity in chloroform at 25° C. of 0.23 dl/grams, and a melting point of 154°–158° C. IR and NMR data are consistent with the following silylamino end-capped polymer structure:

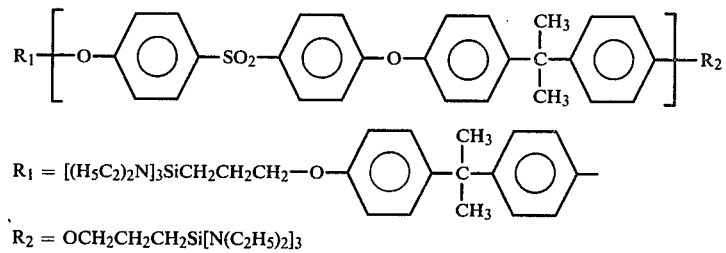

EXAMPLE 6

Into a 2 liter, 4-necked flask, equipped with a mechanical stirrer, water trap, addition funnel, thermometer and argon inlet, there was placed 174.62 grams (0.8 mole) of 4,4'-thiodiphenol, 500 milliliters of DMSO, and 700 milliliters of MCB. Upon dissolution at 75° C., a caustic solution containing 64.96 grams (98.5 percent purity) of NaOH and 75 milliliters of distilled water was introduced. Azeotropic distillation was carried out until no more water was produced. A hot, dry MCB solution containing 215.95 grams (0.753 mole) of 4,4'-dichlorodiphenyl sulfone was introduced. The polymerization reaction was maintained at 165° C. for 90 minutes. Thereafter, the sodium phenolate end-group concentration was determined by titration. A solution of 24.62 grams 3-chloropropyltrimethoxysilane in 30 milliliters of dry MCB was added to the reaction vessel at 165° C. The reaction mixture was held at 165° C. for 30 minutes, and was then brought to room temperature and filtered to remove the salt. The clear, amber-colored filtrate was poured into a Waring blender containing a large excess of isopropanol to precipitate the polymer. The crude product was washed with isopropanol, filtered, and dried in a vacuum oven at 75° C. A white polymer was obtained, which had a reduced viscosity in chloroform at 25° C. of 0.31 and a melting point of 175°–178° C. Spectroscopical data are in agreement with the following structure.

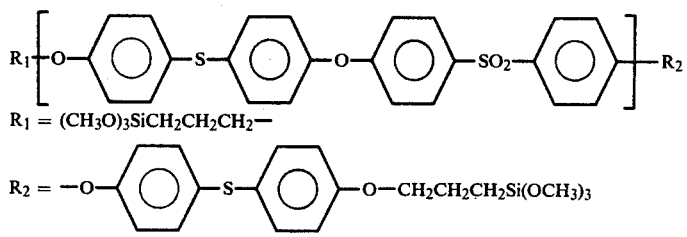

R₁ = (CH₃O)₃SiCH₂CH₂CH₂—

R₂ = —O—⟨phenyl⟩—S—⟨phenyl⟩—O—CH₂CH₂CH₂Si(OCH₃)₃

EXAMPLE 7

Into a 2 liter, 4-necked flask, equipped with a mechanical stirrer, water trap, addition funnel, thermometer, and argon inlet, there was placed 74.49 grams (0.4 mole) of p,p'-biphenol, 350 milliliters of MCB, and 275 milliliters of DMSO. Upon dissolution at 70° C., a caustic solution containing 32.48 grams of NaOH (98.5 percent purity) and 37.5 milliliters of distilled water was added. Azeotropic distillation was carried out until the reaction medium temperature reached 155° C., when a total of 382.5 grams of distillate had been collected. The temperature was lowered to 140° C. and a hot solution of 109.05 grams (0.38 mole) of sulfone monomer in 125 milliliters of dry MCB was rapidly introduced. Thereafter, the reaction temperature was raised to 165° C. by distilling off 162.2 grams of MCB, and maintained at this temperature overnight. Next morning, the sodium phenolate end-groups were determined by titration. A solution of 8.7 grams of 3-chloropropyltrimethoxysilane in 30 milliliters of dry MCB was added to the reaction vessel and the reaction mixture was stirred for an additional 30 minutes. End-point test showed the reaction was complete. The reaction mixture was brought to room temperature, diluted with 400 milliliters of MCB, and filtered. Polymer was recovered from the filtrate by coagulation in isopropanol, washed with additional amounts of isopropanol, and dried at 75° C. under vacuum. A white solid was obtained, which had a reduced viscosity of 0.40 (measured in chloroform at 25° C.) and a melting point between 225° and 230° C. Its NMR and IR spectra are consistent with the following structure:

grams (0.34 mole) of sulfone monomer in 12 milliliters of dry MCB was added. An additional 441.8 grams of solvent was distilled off to raise the reaction temperature to 165° C. It was kept at this temperature for 3 hours. End-capping was effected by adding a solution of 27.6 grams of 3-chloropropyltrimethoxysilane in 50 milliliters of dry MCB into the polymerization mixture at 165° C. End-point test showed the reaction to be complete in 40 minutes. The resulting polymer was recovered according to the procedure described in Example 7. A white solid was obtained. The recovery was 91 percent of theoretical. The product had a reduced viscosity in chloroform at 25° C. of 0.074 dl/gm, and a melting point between 155° and 160° C. Its NMR and IR spectra are consistent with the following structure:

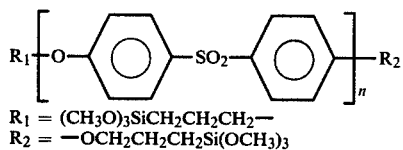

R₁ = (CH₃O)₃SiCH₂CH₂CH₂—
R₂ = —OCH₂CH₂CH₂Si(OCH₃)₃

EXAMPLE 9

Using an apparatus similar to that described in Example 8, there was placed 91.58 grams (0.4 mole) of bisphenol-A, 175 milliliters of DMSO, and 350 milliliters of MCB. Upon heating to dissolution, a solution containing 32.48 grams of sodium hydroxide (98.5 percent purity, 0.8 mole) and 325 milliliters of distilled water was added. Azeotropic distillation was carried out until the temperature reached 155° C. when 409.3 grams of distillate had been collected in the water trap. A hot solution of 104.4 grams (0.364 mole) of sulfone monomer in 125 milliliters of dry MCB was added. The polymerization was kept at 164° C. for 90 minutes. Thereafter, the sodium phenolate end-groups were titrated, and a solution of 11.4 grams (20 percent excess) of 3-chloromethyldimethylmethoxysilane in 10 milliliters of dry MCB was introduced for the end-capping. The reaction was complete in 30 minutes. After dilution with 400 milliliters of dry MCB, the polymer was re-

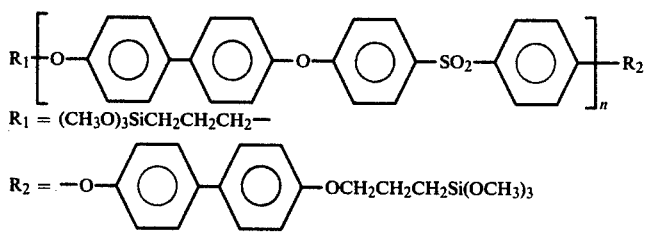

R₁ = (CH₃O)₃SiCH₂CH₂CH₂—

R₂ = —O—⟨phenyl⟩—⟨phenyl⟩—OCH₂CH₂CH₂Si(OCH₃)₃

EXAMPLE 8

Into a 1-liter, 4-necked flask, equipped with a mechanical stirrer, water trap, addition funnel, thermometer and argon inlet, there was placed 101.12 grams (0.4 mole) of 4,4'-sulfonyl-diphenol, 510 milliliters of MCB, and 250 milliliters of DMSO. Upon dissolution at 75° C., a caustic solution containing 16.24 grams (98.5 percent purity, 0.8 mole) of sodium hydroxide and 37.5 milliliters of distilled water was introduced. Azeotropic distillation was carried out until the temperature of the reaction medium reached 155° C. when a total of 290.4 grams of distillate was collected. The reaction temperature was lowered to 140° C. and a hot solution of 97.55 covered according to the procedure described in Example 7. A white powdery solid polymer was obtained. The recovery was 90 percent of theoretical. The polymer had a reduced viscosity measured in chloroform at 25° C. of 0.22 dl/gm. Its NMR and IR spectroscopic data are consistent with the following structure:

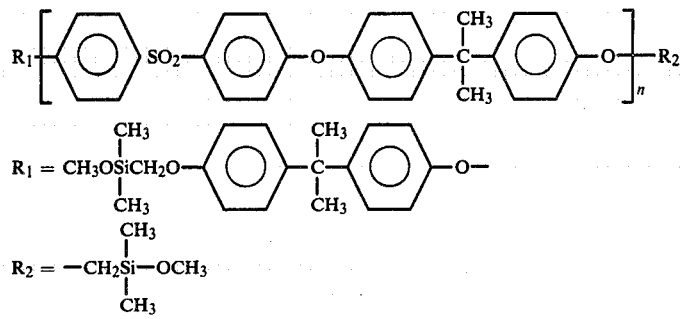

EXAMPLE 10

Model Reaction

Bis(trimethoxysilylpropyl)derivative of Bisphenol-A

In a 500 cc 4-neck flask fitted with stirrer, thermometer, dropping funnel, and Y tube with $N_2$ inlet tube and helices-packed fractionating column with water trap and condenser, were placed the following:

| | |
|---|---|
| 22.83 grams Bisphenol-A | .1 mole |
| 45 milliliters DMSO | |
| 55 milliliters toluene | | air was displaced by nitrogen and 16.02 grams 49.94 percent NaOH (0.2 mole) was added. The mixture was refluxed, removing water until no more was evident; then toluene was distilled off to a pot temperature of 160° C. The mixture was cooled to 120° C. and 43.7 grams $Cl(CH_2)_3Si(OCH_3)_3$ (0.22 mole) was added. Heating was continued at 115°–120° C. for 1½ hours until test showed that no residual alkalinity remained. The product was filtered through an M porosity sinter glass funnel, and the salt cake was washed with dry toluene. The toluene-DMSO solution was washed repeatedly with water to extract DMSO, then the toluene and traces of water were removed by distillation under vacuum, finally to 150° C./1 mm pressure.

The residue product was obtained as a clear pale liquid, yield 52.9 grams (theoretical: 55.3). Analysis showed 0.006 percent OH by poteniometric titration, and NMR analysis showed the correct ratio (2/6) of Bisphenol-A to siloxane methyls.

EXAMPLE 11

Model Reaction

Bis(trimethoxysilylpropyl) derivative of Bisphenol-S

The same apparatus and procedure as in Example 10 was used with the following:

| | |
|---|---|
| 25.03 grams 4,4'-Dihydroxydiphenyl sulfone | 0.1 mole |
| 60 milliliters DMSO | |
| 85 milliliters toluene | |
| 16.04 grams 49.90 percent NaOH | 0.2 mole |

The bisphenol disodium salt was dehydrated as before and most of the toluene was distilled. The mixture was cooled and there was added: 43.7 grams 3-chloropropyltrimethoxysilane—0.22 mole. The reaction mixture was heated a total of 2½ hours at about 130° C. to complete the etherification. The product was filtered to remove sodium chloride, and the salt was washed with dry toluene. Salt recovered-11.6 grams (theoretical: 11.69). The filtrate was washed repeatedly to remove DMSO, then the toluene was removed by distilling as in Example 10. The yield of light colored viscous liquid product was 56.1 grams (theoretical: 57.48).

EXAMPLE 12

Silane End-Capped Bis S Polyether

In an apparatus similar to that described in Example 10, the following were placed:

| | |
|---|---|
| 25.03 grams 4,4'-Dihydroxydiphenyl sulfone | .1 mole |
| 70 milliliters DMSO | |
| 100 milliliters toluene | |
| air was displaced by $N_2$ and: | |
| 16.03 grams 49.90 percent NaOH | .2 mole | added. The mixture was refluxed, removing water until no more was evident, then toluene was distilled off to a pot temperature of 160° C., and a solution of:

| | |
|---|---|
| 24.15 grams 4,4'-Difluorodiphenyl sulfone | .095 mole |
| 33 milliliters dry chlorobenzene | | added. The mixture was heated with stirring at 160°–170° C. for 2½ hours to complete the oligomerization, then cooled to 130° C. and:

| | |
|---|---|
| 3.0 grams $Cl(CH_2)_3 Si(OCH_3)_3$ | 0.15 mole | added. Heating was continued at 130° C. for 1¾ hours to complete the end capping reaction. The product was diluted with 100 milliliters of dry monochlorobenzene and filtered through a medium porosity sintered glass funnel. The clear, colorless filtrate was coagulated in methanol using a Waring blender, and the granular white powder washed further with methanol, filtered, and dried in a vacuum oven.

Yield: 39 grams (theoretical: 47 grams)

$RV_{NMP}=0.49$ (in N-methylpyrollidone at 25° C.)

To partially hydrolyze the siloxane end methoxyls, 10 grams of the polymer was slurried in a 20 percent aqueous solution of acetic acid and heated with stirring at 60° C. for 1½ hours, then washed free of acid and vacuum dried. RV$_{NMP}$-0.67. The partially hydrolyzed siloxane polymer cured appreciably faster on molding than did the original polymer.

EXAMPLE 13

Silane end-capped Bis A - Difluorobenzophenone polyether

In an apparatus like that described in Example 10 were placed the following:

| | |
|---|---|
| 22.83 grams Bisphenol A | .1 mole |
| 70 milliliters DMSO | |
| 80 milliliters toluene | |

Air was displaced by nitrogen and there was added:

| | |
|---|---|
| 15.85 grams 50.48 percent NaOH | .2 mole |

The mixture was refluxed, removing water until no more was evident, then toluene was distilled off to a pot temperature of 150° C. A solution of:

| | |
|---|---|
| 20.51 grams 4,4'-Difluorobenzophenone in 20 milliliters dry chlorobenzene | .094 mole | was gradually added. On adding the last increment of the difluorobenzophenone, the polymer viscosity became very high, but on continued heating at about 160° C. for 1½ hours it decreased somewhat. The mixture was diluted with dry chlorobenzene and cooled to about 140° C., and a total of 4.3 grams Cl(CH$_2$)$_3$Si(OCH$_3$)$_3$ (0.022 mole) added. Heating was continued at 130°–140° C. until test showed no residual alkalinity. The mixture was diluted further with dry chlorobenzene, filtered, and the clear filtrate coagulated in methanol as in Example 12.

Yield = 30.7 grams (41.5 theo)
RV CHCl$_3$ = 0.66

Clear colorless solutions of polymer (20 percent) in THF (tetrahydrofuran) were made up. The solution without additive remained stable for weeks, whereas one treated with a trace of dibutyltin dilaurate gelled within 8 hours, and another with trifluoroacetic acid gelled overnight at room temperature.

In a major aspect of the invention, the alkoxy-, alkanoyloxy-, or dialkylamino- silane end-capped polyarylene polyethers are hydrolyzed to form silanol end-capped polyarylene polyethers. It is well known that the following reactions take place: ;ti Si-OAlkyl→Si-OH + HOAlkyl (6)

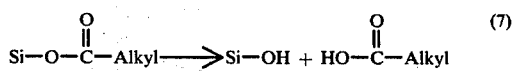

(8) Si-N(Alkyl)$_2$→Si-OH + HN(Alkyl)$_2$

It is also known that silanol groups can condense to form siloxane groups:

The combination of the hydrolysis reaction and condensation reaction can be employed to cure the silane end-capped polyarylene polyethers of the invention to form cross-linked polymers. Curing can be effected in several different ways. For instance, the solid polymer can be heated to a temperature above its glass transition temperature, e.g., to a temperature of from about 150° to about 350° C., for a period of about 1 to about 100 minutes, preferably under pressure (a pressure range of from contact pressure, e.g., about 1 to 3 psi, to about 600 psi or more, is recommended except for coating applications, where no pressure is used). Trace amounts of moisture, which is inevitably present from the atmosphere (the polymer will absorb atmospheric moisture), initiate the hydrolysis reaction. The silanol groups then condense to generate more water, which further propagates the two reactions.

The condensation reaction proceeds at a much faster rate than the hydrolysis reaction. However, when the resin is in the solid state, the rigid polymeric backbone prevents the silanol groups from interacting to any great extent. Therefore, a two-step curing process is possible. The solid resin, in finely divided form, can be "prehydrolyzed", in aqueous medium at a temperature that is below the glass transition temperature of the polymer. The subsequent silanol end-capped polymer can thereafter be heated above its glass transition temperature to effect cure. The prehydrolysis procedure is illustrated in the following Example:

EXAMPLE 14

Prehydrolysis of PSF-SR*

*Unless otherwise indicated, "PSF-SR" refers to the polymers made from bisphenol-A and sulfone monomer illustrated in Example 1.

Prehydrolysis of the PSF-SR resins is carried out in an aqueous suspension to minimize the risk of premature gelation. A catalyst such as acetic acid is used. (Bases and metal soaps will also catalyze the hydrolysis and condensation reactions, as is known in the art.) The following describes the typical procedures used for this transformation.

A. To a solution consisting of 50 grams of acetic acid and 950 milliliters of distilled water was added 100 grams of a PSF-SR (R.V.=0.29, $\overline{Mn}$=10,900) resin in fine powdery form. The slurry was heated to a temperature for a period of three hours. Thereafter, the reaction mixture was cooled to room temperature and the resin was collected by filtration. The crude product was washed twice with an excess of isopropanol in a Waring blender to remove the absorbed acetic acid. The product was collected and dried at 85° C. under vacuum. The recovery was practically quantitative.

The prehydrolyzed PSF-SR resin is physically identical to its precursor. At this stage it remains thermoplastic and is soluble in all PSF-SR solvents. NMR analysis showed that 23 percent of the silane end groups in the above product were hydrolyzed.

B. To a boiling aqueous acetic acid solution composed of 120 grams of acetic acid and 1080 milliliters of distilled water was charged 120 grams of a PSF-SR resin (R.V.=0.45). The fluff was kept in suspension through vigorous stirring. After 30 minutes refluxing at 100° C., the resin was separated by filtration. Working through the same recovery steps described above, 118 grams of product was obtained. The resulting product had a R.V. of 0.48 and was shown to be 20 percent hydrolyzed by NMR analysis.

Glass Transition Temperatures

Figure 2:
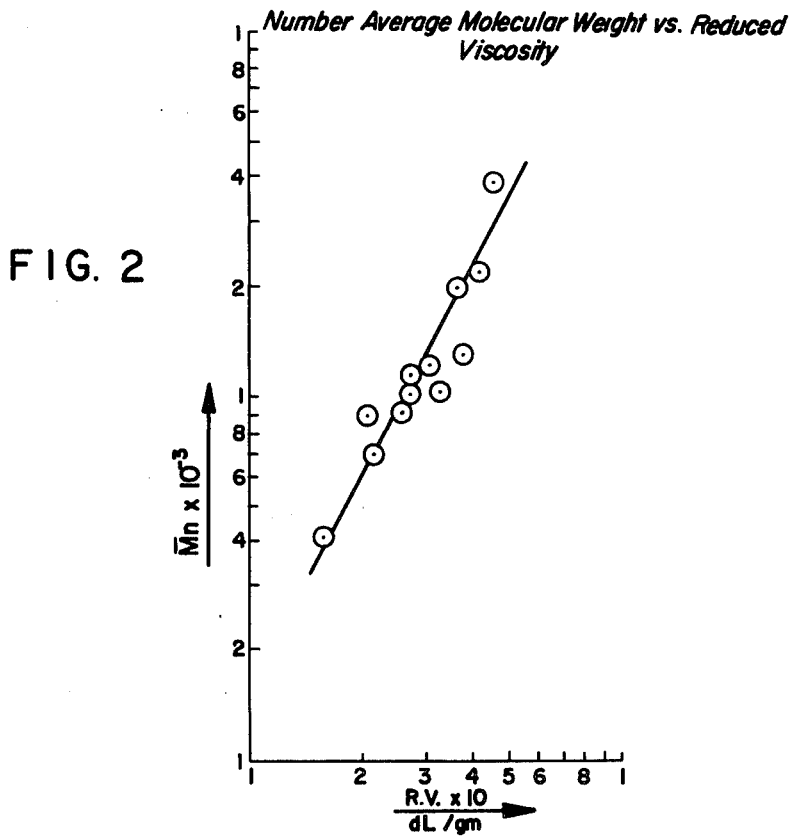

The glass transition temperatures were determined by using a Differential Scanning Calorimeter for PSF-SR resins having various number average molecular weights. The results are plotted on the graph shown on FIG. 1. The correlation between number average molecular weight and reduced viscosity (at 25° C., in chloroform) is shown in the graph contained in FIG. 2. The procedure for using the Differential Scanning Calorimeter is described by A. Duswalt, "Industrial Research," July 1975, pp. 42–45.

The following group of Examples further illustrates the hydrolysis and condensation reactions:

EXAMPLE 15

The polymer prepared in Example 4 was compression molded at 600 psi and 200° C. for 30 minutes followed by an additional 60 minutes at 275° C. A tough, clear, amber-colored plaque was obtained. The cured plaque exhibited good stress-crack resistance to organic solvents.

EXAMPLE 16

The silylacetoxy end-capped polymer prepared in Example 3 was compression molded at 275° C. under a pressure of 1,000 psi for 10 minutes. The cured plaque was clear, amber-colored and was no longer soluble in chloroform. It exhibited good mechanical strength and a much improved stress-crack resistance to organic solvents than conventional thermoplastic polysulfone resins.

EXAMPLE 17

The polymer prepared in Example 6 was cured by compression molding at 600 psi and 275° C. for 15 minutes. A clear, amber-colored plaque was obtained. The plaque had the following mechanical and thermal properties:

| | |
|---|---|
| Tensile modulus, psi | 259,000 |
| Tensile strength, psi | 7,900 |
| Yield strength, psi | 7,900 |
| Elongation at break, percent 5.5 | |
| Pendulum impact, ft-lb/in$^3$ | 55 |
| Tg,°C. | 125 |
| Modulus at 250° C., psi | 1,000 |

It also exhibited good stress-crack resistance to organic solvents.

EXAMPLE 18

A 12 gram quantity of the reactive polysulfone prepared in Example 8 was compression molded at 600 psi and 275° C. for 10 minutes to give a 4"×4"×20 mil plaque. The latter was clear, yellow-colored, and fairly brittle. Solubility test showed the plaque to be highly cured.

EXAMPLE 19

A slurry containing 20 grams of the product prepared in Example 9, 10 grams of glacial acetic acid, and 80 milliliters of distilled water was heated to refluxing (100° C.) while under vigorous stirring. After 2 hours of refluxing, the hydrolyzed polymer was recovered by filtering, washing with isopropanol, and drying under vacuum at 75° C. 19 grams of the hydrolyzed polymer having a reduced viscosity of 0.21 dl/gm was recovered. The presence of silanol end-groups in the product was confirmed by the NMR data, which corresponds to the following structure.

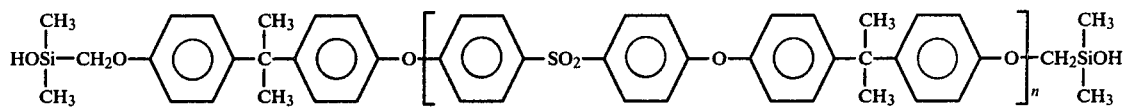

EXAMPLE 20

12 grams of the polymer prepared in Example 7 was compression molded at 600 psi and 320° C. for 10 minutes to give a 4"×4"×20 mil plaque. The plaque was transparent, and brown-colored. It was tough and exhibited good stress-crack resistance to organic solvents. Its mechanical and thermal properties are as follows:

| | |
|---|---|
| Tensile modulus, psi | 211,000 |
| Tensile strength, psi | 9,500 |
| Yield strength, psi | 9,500 |
| Yield Elongation, percent 9 | |
| Elongation at break, 11 | |
| Pendulum impact, ft-lb/in$^3$ | 99 |
| Tg, °C. | 215 |
| Modulus at 300° C., psi | 700 |

EXAMPLE 21

Rate of Hydrolysis Measurement

Figure 3:
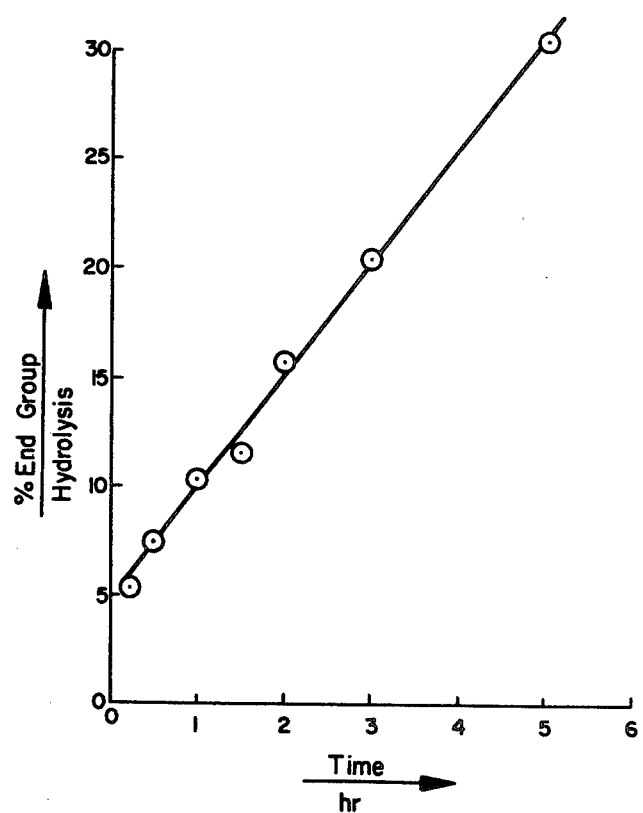

The rate of hydrolysis of PSF-SR resins in an aqueous suspension, shown in FIG. 3 and Table II, below, was measured with two independent analytical methods.

1. GC Method—Using a 5 milliliter vial fitted with a "Teflon"-lined aluminum cap, there was placed 0.5 gram of PSF-SR (R.V.=0.3) and 5 milliliters of a 5 percent (by volume) aqueous acetic acid solution. The sealed vial was shaken vigorously to suspend the resin particles. Thereafter, the sample was heated in a constant temperature bath at 80° C., (±0.1° C.) for a specified time. After quenching, samples were withdrawn with syringe for the GC analysis. A Perkin-Elmer 990 Flame Ionization Gas Chromatograph fitted with a "Carbowax "-coated "Teflon" (40/60 mesh) packed column was employed. The amounts of methanol and methyl acetate were determined. The percent of hydrolysis was measured by the amount of methanol evolved.

2. NMR Method—The hydrolyzed PSF-SR resins as described above were recovered by filtering and washing with isopropanol. After vacuum drying, the samples were analyzed by NMR as described in Section D, Example 1. The percent of hydrolysis was calculated from a decrease in the Hs/Hg signal intensity ratio.

TABLE II

HYDROLYSIS OF PSF-SR$^a$ END GROUPS AT 80° C. IN 5 PERCENT ACETIC ACID

| | PERCENT Hydrolysis | |
|---|---|---|
| Time Hrs. | By GC Method | By NMR Method |
| 0.25 | 5.4 | 6 |
| 0.50 | 7.6 | 11 |

TABLE II-continued
HYDROLYSIS OF PSF-SR[a] END GROUPS AT 80° C. IN 5 PERCENT ACETIC ACID

| Time Hrs. | PERCENT Hydrolysis | |
|---|---|---|
| | By GC Method | By NMR Method |
| 1.0 | 10.3 | 16 |
| 1.5 | 11.5 | 17 |
| 2.0 | 15.7 | 17 |
| 3.0 | 20.4 | 24 |
| 5.0 | 30.3 | 28 |
| 21.0 | 77.3 | 52[b] |

[a]Initial R.V. 0.30 (Mn 10,900).
[b]Partially gelled in chloroform; may not represent the whole sample.

EXAMPLE 22

The mechanical and thermal properties of three crosslinked PSF-SR resins having initial R.V. ranging from 0.24 to 0.45 dl/gm. together with those of a standard polysulfone are listed in Table III. The PSF-SR resins were molded at 600 psi and 300° C. for 30 minutes. The standard polysulfone was molded at 600 psi and 300° C.

toughness. A plausible explanation is that in a PSF-SR network, the rigid PSF chains are linked together through the very flexible siloxane bonds. Consequently, even at high degrees of crosslinking, some molecular mobilities are still possible.

Figure 4:
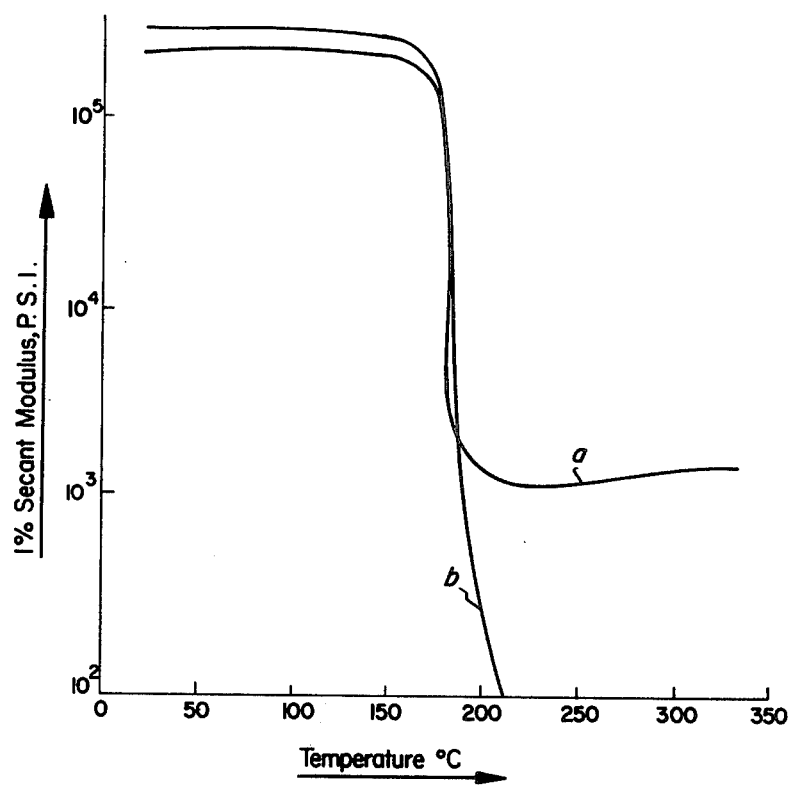

Owing to the presence of siloxane units, cured PSF-SR resins possess a somewhat lower Tg than the standard polysulfone. However, they retain a residual modulus at temperatures well beyond the Tg. The magnitude of this residual modulus is a measure of the crosslinking density. As shown in Table III, above, the value increases with decreasing initial R.V. of the resins. This is expected because higher crosslinking densities should result from resins having lower initial molecular weights. A typical E-T (modulus-temperature) curve of the PSF-SR resins, together with that of a standard polysulfone, are shown in FIG. 4.

The effects of varying crosslinking densities on the properties of a PSF-SR resin are clearly demonstrated by the data shown in Table IV, below, where the Tg and moduli at 250° and 350° C. are related to the swelling index and percent extractable values. Swelling

TABLE III
MECHANICAL AND THERMAL PROPERTIES OF CROSSLINKED PSF-SR

| Sample No. | 1 | 2 | 3 | Commercial Polysulfone* |
|---|---|---|---|---|
| Initial R.V. dl/gm. | 0.45 | 0.30 | 0.24 | Control |
| Tensile Modulus, psi | 261,000 | 267,000 | 250,000 | 280,000 |
| Tensile Strength, psi | 10,210 | 10,000 | 8,980 | 10,500 |
| Yield Strength, psi | 10,210 | 10,000 | 8,980 | 10,500 |
| Yield Elongation, percent | 8 | 8 | 8 | 8 |
| Elongation at Break, percent | 10 | 9 | 9 | 25 |
| Notched Izod Impact Ft.-lbs./Inc. | 1.22 | — | 2.02 | 1.3 |
| Pendulum Impact Ft.-lbs./In.[3] | 123 | 49 | 97 | 196 |
| Tg, °C. | 165 | 170 | 160 | 180 |
| Modulus at 250° C., psi | 900 | 1,100 | 1,400 | Very low |

*The commercial polysulfone used here and in other Examples as a control is the reaction product of bisphenol-A and 4,4'-dichlorodiphenyl sulfone, having a Melt Flow at 650° F. (343° C.) and 44 psi (by ASTM D 1238) of about 6.5 decigrams/minute.

The tensile properties of the PSF-SR resins are comparable to those of the standard polysulfone. Their lower elongations at break are indicative of a crosslinked structure. There is insufficient data at this moment to show any trend in impact properties which appear to be influenced by both the crosslinking density and by the initial molecular weight. Roughly speaking, their Izod impact strengths are equal or better, and their pendulum impact strengths are lower than those of standard polysulfone. In comparison with some conventional thermosets, such as the epoxy resins, the PSF-SR resins show good retention of the toughness of the base polysulfone. This behavior is significant because a high crosslinking density, which is essential for providing a good environmental stress-crack resistance, can be realized with the PSF-SR resins without much trade-off in Index equals the volume of swollen gel/volume of unswollen polymer (after extraction). Extractables equals weight of boiling methylene chloride-soluble portion/total weight of cured resin.

TABLE IV
CHARACTERISTICS OF CROSSLINKED PSF-SR

| Sample Description | Swelling Index | Extractables, Percent | Tg, °C. | 250° C., psi | 350° C., psi | Cure Conditions |
|---|---|---|---|---|---|---|
| 0.38 Initial R.V., Thermally Cured | 6.0 | 19.8 | 155 | 570 | 800 | 600 psi, 300° C., 20 minutes |
| 0.38 Initial R.V., Prehydrolyzed and Thermally Cured | 3.1 | 1.3 | 175 | 1,260 | 1,320 | 600 psi, 275°–300° C., 20 minutes |
| 50/50 Blend Commercial Polysulfone 0.27 Initial R.V., Thermally Cured | 6.4 | 56.4 | 170 | 410 | 200 | 600 psi, 275° C., 15 minutes |

Under identical curing conditions, the prehydrolyzed sample produced a much higher crosslinking density as evidenced by the markedly lower swelling index and extractables. It also exhibited a significantly higher Tg as well as higher moduli at elevated temperatures.

Also included in Table IV are properties of a sample composed of a 50/50 blend of Commercial polysulfone/0.27 initial R.V. PSF-SR. This compatible blend gave a Tg slightly below that of the commercial polysulfone, but retained some residual modulus at much higher temperatures.

EXAMPLE 24

Environmental stress-crack resistance data were measured using ⅛-inch strips of the compression molded specimens at constant stress levels using an environment of solvent-saturated cotton swabs attached to the specimens. The time elapsed at a given stress level before rupture occurred was recorded. Three solvents commonly used by the coating industry were studied. Results are listed in Table V.

cured PSF-SR resins still contain unreacted silanol groups which would result in higher hydrophilicities.

As illustrated by the foregoing Examples, cured PSF-SR resins retain much of the properties of the parent polyfulfone. In addition, they offer a dramatically improved environmental stress-crack resistance, a potential high-use temperature, and much desired adhesive properties (discussed below). All of the above properties are, however, strongly influenced by the finished network structures.

TABLE V

ENVIRONMENTAL STRESS-CRACK RESISTANCE

| Sample Description | Cure Conditions | Extractables % | Toluene Stress Psi. | Toluene t to Rupture Min. | Trichloroethylene Stress Psi. | Trichloroethylene t to Rupture Min. | Acetone Stress Psi. | Acetone t to Rupture Min. |
|---|---|---|---|---|---|---|---|---|
| 0.38 Initial R.V. Prehydrolyzed Thermally Cured | 600 psi, 275°–300° C., 20 minutes | 1.3 | 1000 | 180$^a$ | 2000 | 53 | 2000 | 240$^a$ |
| 0.38 Initial R.V. Thermally Cured | 600 psi, 300° C., 20 minutes | 19.8 | 1000 2000 | 24 15 | 2000 | 31 | 2000 | 12 |
| 50/50 Blend Commercial polysulfone/0.27 Initial P.V. PSF-SR | 600 psi, 275° C., 15 minutes | 56.4 | 1000 500 | 3 sec. | 1000 2000 | 48 14 | 2000 | 8 |
| Commercial polysulfone | 600 psi, 300° C., | Soluble | 200 | Instantaneous | 200 | 10 sec. | 2000 | Instantaneous |

$^a$Test discontinued at this point.

PSF-SR resins were shown to exhibit a dramatic improvement in environmental stress-crack resistance over the standard polysulfone. The extent of improvement increases with increasing crosslinking densities which were indicated here by percent extractables. Interestingly, a noticeable improvement was realized even with a 50/50 blend of commercial polysulfone/PSF-SR. Optimum performance, however, can be achieved only with neat PSF-SR resins at high crosslinking densities.

EXAMPLE 25

Polysulfone is well known for its excellent electrical properties which should be reflected by the PSF-SR. A comparison of electrical properties of these two polymers is shown in Table VI. The PSF-SR resins were cured at 600 psi and 300° C. for 15 minutes.

TABLE VI

ELECTRICAL PROPERTIES OF PSF-SR

|  | PSF-SR$^a$ | Commercial Polysulfone |
|---|---|---|
| Dielectric Strength, Volts/mil. | 380 | 425 |
| Arc Resistance, seconds Tungsten Electrodes | 124 | 122 |
| Volume Resistivity at 72° F. ohm-cm | 1.3 × 10$^{16}$ | 5 × 10$^{16}$ |
| Dielectric Constant at 74° F. 60 cps-1 mc | 9.69 | 3.07 |
| Water Absorption per cent in 24 hours. | 0.7 | 0.3 |

$^a$0.45 initial R.V., a pilot plant-produced sample containing abnormally high amount of residual alkalinity which could have adversely affected the measured electrical properties.

PSF-SR resins were found to absorb twice as much water as the standard polysulfone. This result is surprising because siloxane linkages formed by the end groups are hydrophobic. A plausible explanation is that the

ADHESIVE PROPERTIES

Owing to the chemical nature of the silane end groups, silane end-capped polyarylene polyether resins exhibit markedly improved adhesive properties compared with standard polysulfone.

In order to obtain optimum adhesive performance with standard polysulfone, metal substrates must be thoroughly cleaned, often by using an acid or an alkali etch, and the adhesive joints must be bonded using very high temperatures of the order of 700° F. Therefore, despite the fact that acceptable adhesive strength can be obtained with standard polysulfone in many cases, it has not been successful commercially in adhesive applications because of the stringent requirements for its use. In the experiments presented in this section, the metal substrates were subjected only to a solvent wipe to degrease them. Therefore, it must be kept in mind that the poor adhesion shown for the standard polysulfone controls could be improved considerably, but only by using the commercially undesirable means of etching the metal substrates, and bonding at much higher temperatures.

The silane end-capped resins possess three important features which are absent from the standard polysulfone. First, the presence of hydrolyzable silane end groups provides an inherent coupling ability to many inorganic and metallic surfaces; second, the silane end-capped resins have a much lower melt (or solution) viscosity which greatly facilitates "wetting" during the formation of adhesive joints; and third, once cured, silane end-capped resins will offer better creep resistance at elevated temperatures.

The usefulness of silane end-capped resins as a structural adhesive is illustrated by its ability to bond the aluminum substrates shown in Table VII. Strong adhesive joints also have been made with a variety of other substrates including glass, steel, copper, and some silicon-containing polymers. The first two speciments were prepared using a 3–10 mil film PSF-SR interlayer. The film was prepared by pressing the resin powder at about 200 psi for 5 minutes at 190° C. The adhesive joints were held together under contact pressure (about 5–10 psi) during the cure. The PSF-SR prime coating for the third specimen was applied from methylene chloride solution.

TABLE VII

ADHESIVE PROPERTIES OF PSF-SR

| Substrate(s) | Cure Conditions | Strength | Remarks |
|---|---|---|---|
| Aluminum/PSF-SR (0.36 R.V.) | 270° C., 1 hr. | 28 lbs/in. (T-peel)[a] | 2–3 lbs/in. with standard polysulfone |
| Clad Aluminum Alloy/ PSF-SR (.33 R.V.) | 270° C., ½–1 hr. | 4,700 psi (Lap Shear)[b] | Comparable to Epoxy/ polyamide structural adhesive |
| Commercial Polysulfone Foam/Aluminum[c] | 240° C., 10 min. | 23 lbs/in. (T-peel)[a] | 3 lbs/in. with standard polysulfone |

[a]Tested at 2"/min. cross-head speed.
[b]ASTM-D-10002.
[c]PSF-SR used as a prime coating.

To prepare strong adhesive joints, the silane end-capped polyarylene polyether interlayer must possess good wettability and high cohesive strength. While wetting is normally not a problem for solution-based applications, high R.V. resins (>0.45) are not recommended for applications where a melt process is contemplated. This is because of their inadequate melt flows which tend to result in poor wetting during bonding. On the other hand, very low R.V. PSF-SR resins (<0.2) have little initial mechanical strength and must be substantially advanced to build up a satisfactory cohesive strength.

The above considerations are illustrated by the following experiment. A PSF-SR resin was hydrolyzed to different extents to yield products of varied melt flows and cure speeds. Peel strengths of aluminum/aluminum joints bonded with each of the above resins were measured and listed in Table VIII. The PSF-SR resins were applied as powder interlayers, which fused to form a continuous film during cure.

TABLE VIII

ADHESIVE PROPERTIES OF PSF-SR RESINS HAVING DIFFERENT INITIAL M. WTS. AND CURE SPEEDS

| Hydrolysis[a] Condition | R.V.[b] | Cure Speed[e] | Peel Strength[d] Lbs./In. |
|---|---|---|---|
| Control | 0.28 | Slow | 10 |
| 5 per cent Acetic Acid | 0.3–0.4 | Fairly Fast | 30 |
| 10 per cent Acetic Acid | 0.4–0.5 | Fast | 31 |
| 25 per cent Acetic Acid | 0.5[c] | Very Fast | 6 |

[a]Hydrolysis was carried out at 100° C. for a period of two hours.
[b]Measured in chloroform at 25° C.
[c]Only partially soluble in chloroform
[d]Measured with Instron at a cross-head speed of 2" per minute.
[e]All joints cured at 275° C. for a 10-minute cycle at about 100 psi.

The control was apparently undercured and its low cohesive strength is reflected by the much lower peel strength value observed. A similar weak joint resulted when a highly hydrolyzed resin was used. In this instance poor wetting is believed to be the cause. When an adhesive joint is prepared under conditions so that the PSF-SR interlayer would provide not only an adequate melt flow initially but also a highly cured composition at the end, a good joint strength is usually ensured.

Preparation of Adhesive Joints

For this purpose, the silane end-capped polyarylene polyether may be applied either as an adhesive interlayer or as a prime coating on the substrates. The recommended procedures are the following:

1. As adhesive interlayer—the silane end-capped resins may be melt fabricated into films at a temperature below or around 200° C. without any noticeable advancement. At this uncured stage the film is rather brittle and is particularly so for films made from resins having a R.V. below 0.25. On the other hand, too high a R.V. is not desirable because a lack of melt flow may lead to poor wetting during the bonding operation. Usually, resins having a R.V. range 0.28–0.35 are preferred. Bonding is effected at a temperature of 250° C. or above, and the required curing cycle time decreases with increasing temperature. Some pressure is necessary to ensure a good wetting and is especially so with the higher R.V. resins. Contact pressure up to about 600 psi for from 3 to 60 minutes is recommended.

2. As prime coatings—silane end-capped polyarylene polyethers are soluble in all polysulfone-soluble solvents. Because of their much lower molecular weights, silane end-capped resin solutions of high solid contents can be prepared conveniently. Besides solution coating, powder or aqueous-emulsion coating techniques could also be applicable. For solution coatings, a silane end-capped resin may be used as is, or prehydrolyzed, or in the presence of a catalyst. Depending on the coating formulation, a broad range of baking conditions may be employed. Useful solvents include chlorinated hydrocarbons, dioxane, and tetrahydrofuran. Substrates include metals such as aluminum, aluminum alloys, stainless steel, carbon steel, tin and tin-plated metals, and copper; inorganic materials such as glass; and plastics such as polysulfone. Useful curing conditions will usually be found within the ranges of 160° to 300° C., contact pressure to 600 psi, and 3 to 60 minutes.

EXAMPLE 26

Two sheets of 25 mil thick aluminum test panels were joined with a 3–5 mil thick film interlayer of the reactive polysulfone prepared in Example 7. The joint was cured by compression molding at 100 psi and 275° C. for 15 minutes. The finished laminate was cut into one-inch width strips and tested for peel strength. Using an Instron machine, the average peel strength was measured to be 14.5 lbs./in. at a cross-head speed of 2 inches per minute.

The solutions coatings referred to above may be used in adhesive applications, or as surface coatings. The latter is illustrated in the following example:

EXAMPLE 27

A coating solution was made with 20 grams of the silylamino end-capped polysulfone in Example 5 and 80 milliliters of cyclohexanone. The solution was applied on a 25 mil thick aluminum test panel and subsequently baked at 265° C. for 15 minutes in an air oven. A clear, tough coating was obtained, which had good stress-crack resistance to acetone or toluene as well as excellent adhesion to the aluminum substrate.

Sizing and Coupling Agents for Fiberglass Reinforced Plastics

In addition to its potential as a matrix resin, silane end-capped polyarylene polyethers can be useful interfacial agents, particularly for composites based on polysulfone. For this purpose, it may be applied either as an integral blend, due to its compatibility with the standard polysulfone, or onto the fiberglass as a coupling and sizing agent. It has been shown that a temporary aqueous emulsion of the silane end-capped resins may be prepared with the aid of a polar solvent, such as tetrahydrofuran, and a surfactant. However, polymer separation usually results after overnight standing.

Some mechanical and thermal properties of the polysulfone laminates in which the glass cloth was treated with PSF-SR are shown in Table IX. The significant improvement in heat distortion temperature and flexural strength and the lowering in notched impact strength are consistent with the anticipated greater fiber/matrix adhesion. Consequently, an even greater beneficial effect may be realized in short glass fiber reinforced polysulfone composites where a higher fiber/matrix adhesion should result in an improvement in fracture toughness.

TABLE IX
PROPERTIES OF PSF-SR TREATED GLASS CLOTH[a] REINFORCED POLYSULFONE LAMINATES

| | | |
|---|---|---|
| Glass, % by wt. (plies) | 30 (5) | 30 (5) |
| Treatment | PSF-SR[b] | None |
| Flexural Strength psi | 29,200 | 21,700 |
| Flexural Modulus × $10^{-6}$ psi | 1.09 | 0.97 |
| Tensile Strength psi | 17,900 | 17,600 |
| Modulus of Elasticity × $10^{-6}$ psi | 1.16 | 1.11 |
| Elongation % | 1.57 | 1.82 |
| Izod Impact Strength ft.-lb./in. Notch | 3.7 | 5.4 |
| HDT at 264 psi, ° C. | 196 | 187 |

[a]OCF-181 heat-cleaned glass cloth.
[b]Treated with a 2% THF solution of PSF-SR (R.V. = 0.45) and followed by a half-hour bake at 150° C.

EXAMPLE 28

The effectiveness of the silane end-capped polyarylene polyethers as a sizing or coupling agent for glass fiber reinforced polysulfone was compared with that of the best commercially available sizing presently available for that purpose. The materials used, experimental procedure, and results are shown below.

MATERIALS USED

| | | |
|---|---|---|
| A-1100 | $H_2NCH_2CH_2CH_2Si(OC_2H_5)_3$ | Union Carbide Corp. |
| A-1111 | $(HOC_2H_4)_2NCH_2CH_2CH_2Si(OC_2H_4)_2$ | 72% active in ethanol Union Carbide Corp. |
| P-1700 | Polysulfone Resin | Union Carbide Corp. |
| 1581-112 | Heat cleaned Fiberglass fabric | J.P. Stevens Co., Inc. |
| PSF-SR-1 | RV = 0.51 | |
| PSF-SR-2 | RV = 0.24 | |
| PSF-SR-3 | RV = 0.17 | |

FABRIC FINISHING

One weight percent active ingredients of A-1100 and A-1111 silane were prepared in water and used to finish 1581-112 fiberglass fabric. Fabric finished with the PSF-SR were prepared in THF at a 2 wt percent solids concentration. The treated fabric was air dried 20 minutes followed by a 2.5 minute heat set at 135° C.

COMPOSITE PREPARATION a. Resin: P-1700 polysulfone resin was dissolved in methylene chloride to a solids content of 20.4 wt percent.
b. Prepreg: The desired fiberglass fabric was treated with the above mentioned polysulfone solution, air dried 3 hours, followed by a 1 hour heat set at 50° C.
c. Lamination: Eleven ply of the prepreg were used to prepare the composites. Composites were pressed 20 minutes at 550° F. and 200 psi pressure using "Teflon" film as a release.

TESTING

Flexural strengths and tangential modulus of elasticity were determined initially and after a 16 hour immersion in 50° C. water according to ASTM designation D-790-71. The results are displayed below in Table X.

TABLE X
PHYSICAL PROPERTIES OF POLYSULFONE LAMINATES REINFORCED WITH SILANE-FINISHED GLASS FABRIC

| Silane | Silane Per Cent Concentration/Solvent | Reduced Viscosity | Per Cent Water Absorption | Flexural Strength (Psi × $10^{-3}$) Initial | Flexural Strength (Psi × $10^{-3}$) Wet[1] | Tangential Modulus (Psi × $10^{-6}$) Initial | Tangential Modulus (Psi × $10^{-6}$) Wet[1] |
|---|---|---|---|---|---|---|---|
| Control (no silane) | — | — | 1.01 | 20.2 | 18.4 | 1.40 | 1.30 |
| A-1100 | 1.0/$H_2O$ | — | 1.21 | 41.6 | 41.9 | 1.73 | 1.49 |
| A-1111 | 1.0/$H_2O$ | — | 0.34 | 53.1 | 49.0 | 1.97 | 1.98 |

TABLE X-continued
PHYSICAL PROPERTIES OF POLYSULFONE LAMINATES REINFORCED WITH SILANE-FINISHED GLASS FABRIC

| Silane | Silane Per Cent Concentration/Solvent | Reduced Viscosity | Per Cent Water Absorption | Flexural Strength (Psi × 10$^{-3}$) | | Tangential Modulus (Psi × 10$^{-6}$) | |
|---|---|---|---|---|---|---|---|
| | | | | Initial | Wet[1] | Initial | Wet[1] |
| PSF-SR-1 | 2.0/THF | 0.51 | 0.25 | 42.6 | 38.8 | 1.93 | 1.66 |
| PSF-SR-2 | 2.0/THF | 0.24 | 0.16 | 53.3 | 50.6 | 2.24 | 2.18 |
| PSF-SR-3 | 2.0/THF | 0.17 | 0.17 | 44.4 | 41.8 | 1.89 | 1.77 |

[1]After a 16 hour immersion in 50° C. water.

Extrusion and Melt Fabrication

The silane end-capped polyarylene polyether resins may be melt fabricated at temperatures much below those normally used for the standard polysulfone because of their much lower glass transition temperatures. They were extruded successfully in a laboratory extruder at temperatures between 200° and 250° C. depending on their initial R.V. No premature gelation was encountered during the extrusion. However, a gradual advancement in molecular weight appeared to have taken place during the extrusion, particularly with those samples which contained residual alkalinity.

Usually, the melt fabrication methods are not recommended for forming the prehydrolyzed materials because of the latter's high cure speeds which severely restrict the extrusion (or molding) latitude.

Melt fabricated PSF-SR articles can be cured in a hot mold or in a post-cure operation, e.g., at 250° to 350° C. for 3 to 60 minutes.

In analogy to the standard polysulfone, the silane end-capped resins must be predried before any melt fabrication in order to eliminate the tendency of foaming due to the absorbed moisture.

Emulsification

A solution consisting of 5 grams of a PSF-SR resin (R.V.=0.23) and 20 milliliter of THF (or any other suitable solvent) was poured into a high-speed Waring blender containing 500 milliliters of distilled water. The blending was continued for 10 minutes to produce a uniform emulsion. However, polymer separation took place during overnight standing.

The emulsion stability may be improved by the addition of a suitable surfactant such as a nonionic surfactant. Long chain alkylphenol ethoxylates, long chain alkyl ethoxylates, and poly(ethylene oxide)/(propylene oxide) block copolymers are illustrative. The aqueous emulsions can be used as sizing for glass, asbestos, or other mineral fibers, and in adhesives and coatings.

EXAMPLE 29

CATALYTIC CURING OF PSF-SR

Mixtures consisting of 10 grams of powdered PSF-SR (standard composition, 0.23 R.V.) and a specified amount of a suitable catalyst were dry blended thoroughly in a mortar. The formulations were subsequently compression molded at 50 psi to a 10 mil thick plaque. The latter were tested for solubility in chloroform and stress-crack resistance in an acetone environment. The results are shown below in Table XI.

TABLE XI

| Catalyst | | Curing Condition | | |
|---|---|---|---|---|
| Type | Concentration | T, °C. | t, min. | Observation |
| HEXA, (hexamethylene-tetramine) | 1% | 220 | 20 | Became only slightly soluble in chloroform; improved stress-crack resistance to acetone. |
| Ammonium Carbonate | 1% | 220 | 10 | Insoluble in chloroform; Improved stress-crack resistance to acetone. |
| Para-Toluene-sulfonic acid | 1% | 220 | 10 | Limited solubility in chloroform; Improved stress-crack resistance to acetone |
| Control (no catalyst) | | 220 | 20 | Remained soluble in chloroform; poor stress-crack resistance. |

The catalytic effect of the above reagents is evidenced by a reduction in chloroform solubility and an improvement in stress-crack resistance of the molded plaques containing them. Under similar molding conditions, the control sample showed practically no curing taking place.

EXAMPLE 30

(Hydrolysis)

A PSF-SR resin having an R.V. of 0.39 (chloroform, 25° C.) was hydrolyzed with a 10% aqueous acetic acid solution at 100° C. for a period of 30 minutes. The recovered resin was shown by NMR technique to be 26% hydrolyzed. A plaque compression molded at 250° C. (15 min., 600 psi) was strong, insoluble in chloroform and resistant to acetone.

EXAMPLE 31

(Coating)

A clear solution containing 20 parts (by wt.) of the hydrolyzed PSF-SR prepared in Example 30, and 80 parts of chloroform was prepared. Coatings on a variety of substrates were made under different conditions, and their properties examined. Results are shown in Table XII.

TABLE XII

| Substrate Type | Aluminum Q-panel | Shim Steel | Copper 0.007" sheet | Window Glass (⅛") |
|---|---|---|---|---|
| Drying Conditions | | | | |
| Room Temperature (overnight) | clear, smooth coating; good adhesion; low solvent resistance | clear, smooth coating; good adhesion; low solvent resistance | Same as Aluminum | Same as Aluminum |
| 130° C. (2 hrs.) | clear, smooth coating; good adhesion; improved solvent resistance | Same as Aluminum | Same as Aluminum | Same as Aluminum |
| 260° C. (2 hrs.) | clear, smooth intact.good adhesion; good solvent resistance | Same as Aluminum | Yellowish, smooth coating; good solvent resistance; low adhesion due to copper oxidation | clear, smooth coating; good adhesion; good solvent resistance |
| 260° C. (16 hrs.) | — | — | — | became slightly yellowish in color; coating remained intact. |

The above 260° C. baked coatings were found to be highly cured as evidenced by their insolubility in chloroform. After 16 hr. heat aging at 260° C., in an air oven the coating remained strong and tough.

EXAMPLE 32

(Injection molding and post curing)

A 50/50 blend of PSF-SR (R.V.=0.27) and a commercial polysulfone was extruded with an 1-Foot single-screw extruder operating at a temperature between 260° to 310° C., and was pelletized to give a uniform composition. The pellets were injection molded using a Van Dorne Injection Machine at 358° C. The barrel residence time was about 3 minutes, and the mold temperature was maintained at 115° C. The injection molded parts were clear, glossy, and without any physical defects. They remained, however, soluble in chloroform under these molding conditions.

The injection-molded parts were post-cured using either an air oven or an acid (or base) bath. For instance, a 2½"×½"×⅛" specimen was heated in an air oven at 275° C. for a period of 35 minutes. The baked specimen became only partially soluble in chloroform and exhibited a substantially improved stress-crack resistance in acetone. Similar improvement also was obtained by placing the specimen in a boiling water bath containing 2-10% acetic acid.

EXAMPLE 33

PSF-SR resin (R.V.=0.36) was compression molded at 220° C. (200 psi, 30 min) to form a 20 mil thick plaque. The latter was laminated with a 4"×1"×1/16" titanium panel at an initial temperature of 220° C. and a finish temperature of 270° C. The total heating time lasted for 55 min., and only contact pressure was used. After cooling to room temperature the specimen gave an 8 lbs/inch L-peel strength when measured with a Hunters Spring. Under similar laminating conditions, adhesion between commercial polysulfone and titanium was below 1 pound/inch.

EXAMPLE 34

(Catalytic curing with a metal soap)

One hundred parts of a PSF-SR resin (R.V.=0.18) was thoroughly blended with 2 parts of a tin soap (GE RTV-5300B). The above formulation was spread on an aluminum Q-panel and heated at 210° C. for about 10 minutes. During the heating, the resin particles fused and formed a coherent film which was no longer soluble in chloroform, and which exhibited good environmental stress-crack resistance. When no metal soap was used, the resin remained thermoplastic after being subjected to the same thermal treatment.

EXAMPLE 35

(Catalytic curing with Hexa)

A series of PSF-SR (R.V.=0.45) formulations containing 0.6, 1.2 and 1.8% by weight of Hexa were prepared by dry blending 25 parts of the powdered resin with a 3% Hexa solution in methanol at loadings of 5, 10, and 15 parts, respectively. Methanol was subsequently removed in a vacuum oven at 45° C. The dried mixes were molded separately into 4"×4"×20 mil plaques at 200° C. under a pressure of 400 psi for a 10-minute cycle. All three plaques were cured, as evidenced by their insolubility in chloroform and good environmental stress-crack resistance in acetone. A control, which contained no Hexa, showed very little cross-linking when it was molded under the same conditions.

EXAMPLE 36

(Catalytic curing with Hexa)

The PSF-SR formulation containing 1.2% by weight of Hexa described in Example 35 was laminated between two 25-mil thick aluminum Q-panels at 200° C. for 10 minutes under a pressure of 400 psi. The finished laminate was cut into one-inch width strips for T-peel strength measurement with an Instrom machine at a cross-head speed of 2 inches/minute. A value of 8.5 pounds/inch was obtained. Without Hexa, the PSF-SR would be expected to react very slowly under these conditions, and a much lower adhesion would result.

EXAMPLE 37

(Hexa-catalyzed coatings on aluminum foil)

Four parts each of three PSF-SR resins having R.V. values of 0.24, 0.30 and 0.45, respectively were dissolved in 20 parts of dichloroethane containing 1 part of a 3% Hexa solution in methanol. Aluminum foil strips (5"×¾"×0.005") were coated with each of the three solutions by dipping and air drying. These coatings were subsequently cured in an air oven at 260° C. for a period of 20 minutes. Coatings made from all three solutions were cured, and exhibited excellent adhesion, impact resistance, and solvent resistance.

EXAMPLE 38

Production Of Polysulfone-Siloxane Block Copolymers

The mono-silanol end-capped polysulfone of Example 19 can be used for making polysulfone/polysiloxane block copolymers.

Fifteen parts of the mono-silanol end-capped polysulfone ($\overline{M}n=6,800$) prepared in Example 19 were dissolved in 100 parts of MCB containing 0.1 part, by weight, of sodium methoxide. The solution was heated to refluxing temperature under a nitrogen blanket. A solution of 15 parts of a hydroxyl-terminated, polydimethylsiloxane ($\overline{M}n=1,352$) in 25 parts of MCB was introduced into the reaction vessel. MCB was slowly distilled off until a total of 64 parts of condensate was collected in 5 hours. The latter contained about 1 part of water. The reaction mixture was allowed to cool down to room temperature. The top layer, which contained mostly unreacted silicone oil, was discarded. The bottom layer was coagulated in isopropyl alcohol, washed with additional isopropyl alcohol, collected, and was dried under vacuum at 60° C. 13.5 Parts of a white solid resin was recovered which had a R.V. of 0.45 (chloroform, 25° C.). IR and NMR data of the product were consistent with the intended polysulfone/polysiloxane block copolymer structure. The copolymer was analyzed to contain 17% by weight of silicone.

What is claimed is:

1. A method of forming an adhesive bond between two substrates which comprises subjecting a composite comprising said two substrates and a layer between said substrates of the silane end-capped polyarylene polyether of the formula:

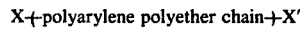

wherein X and X' individually represent silane end groups, wherein each silane end group contains at least one hydrolyzable substituent group or at least one silanol hydroxyl group, to at least contact pressure and to a temperature of at least the glass transition temperature of said polyarylene polyether.

2. An article comprising a substrate and adhering thereto a silane end-capped polyarylene polyether of the formula:

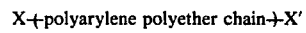

wherein X and X' individually represent silane end groups, wherein each silane end group contains at least one hydrolyzable substituent group or at least one silanol hydroxyl group.

3. The article of claim 2 wherein said substrate is a fibrous material.

4. The article of claim 3 wherein said fibrous material is glass fibers and said silane end-capped polyarylene polyether is a sizing for said glass fibers.

5. A composite comprising thermoplastic polyarylene polyether containing, as a reinforcing filler, the sized glass fibers of claim 4.

6. A blend of a thermoplastic polyarylene polyether and a silane end-capped polyarylene polyether of the formula:

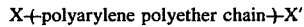

wherein X and X' individually represent silane end groups, wherein each silane end group contains at least one hydrolyzable substituent group or at least one silanol hydroxyl group.

7. The blend of claim 6 wherein the said thermoplastic polyarylene polyether is the thermoplastic reaction product of an alkali metal salt of 2,2-bis(4-hydroxyphenyl)propane and 4,4'-dihalodiphenyl sulfone.

8. A method of forming the article of claim 2 which comprises subjecting a substrate having at least a portion of its surface coated with said silane end-capped polyarylene polyether to an elevated temperature for a period of time sufficient to cure said polyarylene polyether.

9. A method of preparing a shaped polyarylene polyether article which comprises providing a composition comprising a silane end-capped polyarylene polyether of the formula:

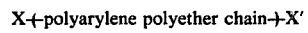

wherein X and X' individually represent silane end groups, wherein each silane end group contains at least one hydrolyzable substituent group or at least one silanol hydroxyl group, melt fabricating said composition to form a shaped article, and then subjecting said shaped article to an elevated temperature for a period of time sufficient to cure said polyarylene polyether.

10. The method of claim 9 wherein the silane end-capped polyarylene polyether composition has at least some of the hydrolyzable substituent groups hydrolyzed by a method which comprises contacting said polyarylene polyether in finely divided solid form with water at a temperature below the glass transition temperature of said polyarylene polyether for a period of time sufficient to hydrolyze at least some of said hydrolyzable groups to silanol hydroxyl groups.

* * * * *